US006688983B2

(12) United States Patent
Yoshizawa

(10) Patent No.: US 6,688,983 B2
(45) Date of Patent: Feb. 10, 2004

(54) CLIENT COMPUTER, SERVER COMPUTER, NETWORK RANKING SYSTEM, NETWORK RANKING METHOD, TASK PROCESSING METHOD AND RECORDING MEDIUM

(75) Inventor: Hideo Yoshizawa, Tokyo (JP)

(73) Assignee: Namco, Ltd., Tokyo (JP)

( * ) Notice: Subject to any disclaimer, the term of this patent is extended or adjusted under 35 U.S.C. 154(b) by 163 days.

(21) Appl. No.: 09/812,946

(22) Filed: Mar. 27, 2001

(65) Prior Publication Data

US 2001/0039211 A1 Nov. 8, 2001

(30) Foreign Application Priority Data

Mar. 30, 2000 (JP) ...................................... 2000-095644

(51) Int. Cl.[7] ........................... A63F 13/00; A63F 9/24; G06F 17/00; G06F 19/00

(52) U.S. Cl. ............................... 463/42; 463/1; 463/40; 463/41; 700/90; 700/91; 700/92; 700/93; 713/181

(58) Field of Search ............................ 463/1–9, 40–43, 463/28, 29; 700/90–93; 713/181

(56) References Cited

U.S. PATENT DOCUMENTS

| | | | |
|---|---|---|---|
| 5,970,143 A | * 10/1999 | Schneier et al. ............ | 713/181 |
| 6,203,433 B1 | * 3/2001 | Kume ......................... | 463/42 |
| 6,468,160 B2 | * 10/2002 | Eliott .......................... | 463/43 |

FOREIGN PATENT DOCUMENTS

| | | |
|---|---|---|
| JP | Hei 09-294139 | 11/1999 |
| JP | 2000-000376 | 1/2000 |
| JP | 2000-042253 | 2/2000 |
| JP | 2000-350854 | 12/2000 |

* cited by examiner

*Primary Examiner*—Teresa Walberg
*Assistant Examiner*—Robert Mendoza
(74) *Attorney, Agent, or Firm*—James T. Carmichael; Miles & Stockbridge P.C.

(57) ABSTRACT

A client computer, server computer, network ranking system, network ranking method, task processing method and recording medium is provided allowing even experienced players to keep a feeling of tension and allowing even beginners to have chances to be ranked high. It is possible to set to only one the number of times the play result of a computer game issued as a task from the server computer 14 to each client computer 10, etc. can be registered for one day. This allows even experienced players to experience a feeling of tension that no retry is possible. On the other hand, this also allows beginners to maintain their interest in the computer game because their play results, however low they may be, also have chances to be ranked high.

15 Claims, 9 Drawing Sheets

CLIENT COMPUTER, SERVER COMPUTER, NETWORK RANKING SYSTEM, NETWORK RANKING METHOD, TASK PROCESSING METHOD AND RECORDING MEDIUM

BACKGROUND OF THE INVENTION

1. Field of the Invention

The present invention relates to a client computer, server computer, network ranking system, network ranking method, task processing method and recording medium, and more particularly, to a network ranking system, etc. having a plurality of client computers connected to a server computer via a network competing against one another for the result of processing of a task.

2. Description of Related Art

When users of a plurality of client computers interconnected via a network compete against one another for the results of processing of a specific task, the ranking of the users'results of processing of the task is conventionally registered (ranking) in a server computer connected to the network. This ranking is displayed in the homepage, etc. of the server computer in the order of scores obtained from the processing result or time required for the processing, etc. However, ranking can be determined any number of times a day for each client computer user, and therefore users who obtain good processing results by processing a same task many times would achieve higher ranking. For example, in the case where the client computer is a game machine and the task is a computer game, players who have played the same computer game many times can more easily obtain higher scores and complete the computer game in a shorter time, achieving higher ranking all the more.

As described above, since the conventional ranking method allows, for example, each game machine player to play the game many times a day, experienced players can easily achieve high ranking, and therefore experienced players would lose a feeling of tension with regard to the computer game. On the other hand, beginners who play the computer game for the first time mostly obtain only low ranking, and therefore beginners would lose their interest in the computer game.

SUMMARY OF THE INVENTION

It is an object of the present invention to solve the above problems and provide a client computer, server computer, network ranking system, network ranking method, task processing method and recording medium allowing even experienced players to continue a feeling of tension and allowing even beginners who play the computer game for the first time to have chances to achieve high ranking.

According to a first aspect of the present invention, there is provided a network ranking system having a server computer and a plurality of client computers interconnected with the server computer via a network and ranking the processing result of each client computer for a task issued by the server computer, the server computer comprising: task issuing means for issuing a task to each client computer to compete against one another for the processing result a predetermined number of times for a predetermined period; and ranking means for receiving an application for ranking based on the result of processing the task sent from each client computer only once for the predetermined period and registering the application, and the client computer comprising: task requesting means for sending task requesting data including the identifier of the client computer and task issuance request to the server computer; task processing means for processing the tasks issued from the server computer; and processing result sending means for sending the task processing result including the identifier of the client computer and task processing by the task processing means to the server computer.

According to a second aspect of the present invention, there is provided a client computer connected to a server computer via a network, competing against other client computers for the result of processing a task issued by the server computer, comprising: task requesting means for sending task requesting data including the identifier of the client computer and a request for issuance of a task to a client computer whose processing result is to be competed a predetermined number of times for a predetermined period to the server computer; task processing means for processing the task issued from the server computer; and processing result sending means for sending the task processing result including the identifier of the client computer and task processing by the task processing means to the server computer.

According to a third aspect of the present invention, there is provided a server computer for controlling a plurality of client computers connected via a network, comprising: task issuing means for issuing a task to each client computer to compete against one another for the processing results a predetermined number of times for a predetermined period; and ranking means for receiving an application for ranking based on the result of processing the tasks sent from each client computer only once for the predetermined period and registering the application.

According to a fourth aspect of the present invention, there is provided a network ranking method using a server computer and a plurality of client computers interconnected with the server computer via a network and ranking the processing result of each client computer for a task issued by the server computer comprising: a task requesting step of sending task requesting data including the identifier of the client computer and a task issuance request to the server computer; a task issuing step of issuing a task to each client computer to compete against one another for the processing results a predetermined number of times for a predetermined period; a task processing step of processing the task issued from the server computer; and a processing result sending step of sending the task processing result including the identifier of the client computer and task processing by the task processing step to the server computer; and a ranking step of receiving an application for ranking based on the processing result of the task sent from each client computer only once for the predetermined period and registering the application.

According to a fifth aspect of the present invention, there is provided a task processing method wherein a client computer connected with a server computer via a network competes against other client computers for processing results of a task issued by the server computer, comprising: a task requesting step of sending to the server computer task requesting data including the identifier of the client computer and a request for issuance of task to a client computer whose processing result is to be competed a predetermined number of times for a predetermined period; a task processing step of processing the task issued from the server computer; and a processing result sending step of sending the task processing result including the identifier of the client computer and task processing by the task processing step to the server computer.

According to a sixth aspect of the present invention, there is provided a recording medium storing a computer-readable program that executes a task processing method, wherein a client computer connected with a server computer via a network competes against other client computers for processing results of a task issued by the server computer, comprising: a task requesting step of sending to the server computer task requesting data including the identifier of the client computer and a request for issuance of task to a client computer whose processing result is to be competed a predetermined number of times for a predetermined period; a task processing step of processing the task issued from the server computer; and a processing result sending step of sending task processing results including the identifiers of the client computer and task processing by the task processing step to the server computer.

The above and other objects, effects, features and advantages of the present invention will become more apparent from the following description of the embodiments thereof taken in conjunction with the accompanying drawings.

DETAILED DESCRIPTION OF THE PREFERRED EMBODIMENTS

Figure 1:
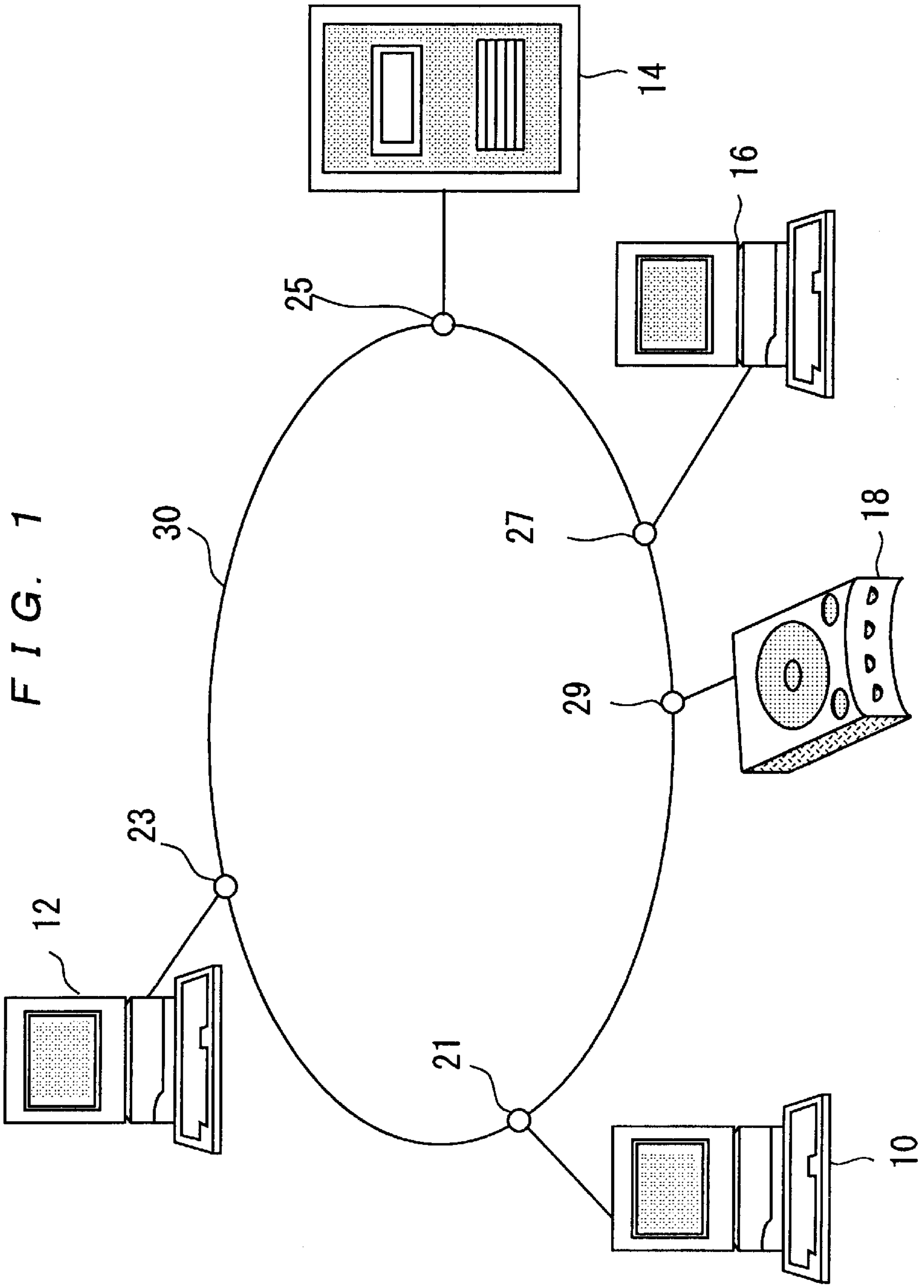
FIG. 1 shows a configuration of the network ranking system, etc. of the present invention.

Embodiments of the present invention will be described below with reference to the accompanying drawings. It is noted that the same reference symbols in the drawings denote the same or corresponding components.

With reference now to the attached drawings, an outline of the network ranking system, etc. of the present invention will be given first, and then embodiments of the present invention will be explained in detail. Here, a case where a task whose processing result is competed for is a computer game will be explained as an example. However, the task is not limited to a computer game, but can be anything such as a test whose processing result is competed for.

FIG. 1 shows a configuration of the network ranking system, etc. of the present invention. In FIG. 1, reference numerals 10 and 12 denote client computers that execute a computer game as a task, reference numeral 14 denotes a server computer that issues the task to the client computer 10, etc. and ranks the processing results, reference numeral 16 denotes a personal computer, which is an embodiment of the client computer, reference numeral 18 denotes a game machine, which is an embodiment of the client computer, reference numeral 30 denotes a network to which the client computers 10 and 12, the server computer 14, the personal computer 16 and the game machine 18, etc. are connected, reference numeral 21 denotes a node that connects the client computer 10 to the network 30, reference numeral 23 denotes a node that connects the client computer 12 to the network 30, reference numeral 25 denotes a node that connects the server computer 14 to the network 30, reference numeral 27 denotes a node that connects the personal computer 16 to the network 30 and reference numeral 29 denotes a node that connects the game machine 18 to the network 30.

The client computers 10 and 12, the personal computer 16 or the game machine 18 (hereinafter collectively referred to as "client computer 10, etc.") can also be connected with the nodes 21, 23, 25, 27 or 29 (hereinafter collectively referred to as "node 21, etc."), respectively via a wired cable or a wireless communication device such as a cellular telephone, PHS (Personal Handyphone System), etc.

As shown in FIG. 1, a plurality of client computers 10, 12, personal computer 16 or game machine 18 (hereinafter collectively referred to as "client computer 10, etc.") are connected to the server computer 14 via the network 30. The client computer 10, etc. sends task requesting data including an identifier specific to the client computer 10, etc. and a request for issuance of a computer game (task) to be played to the server computer 14. The server computer 14 issues the client computer 10, etc. a computer game whose play result is competed for a predetermined period of time, for example, only once a day. The player who is the user of the client computer 10, etc. plays the computer game issued from the server computer 14 and then sends the server computer 14 the identifier of the client computer 10, etc. and play result (processing result). The ranking based on the play results sent from the client computer 10, etc. is registered for a predetermined period of time, for example only once a day.

Figure 2:
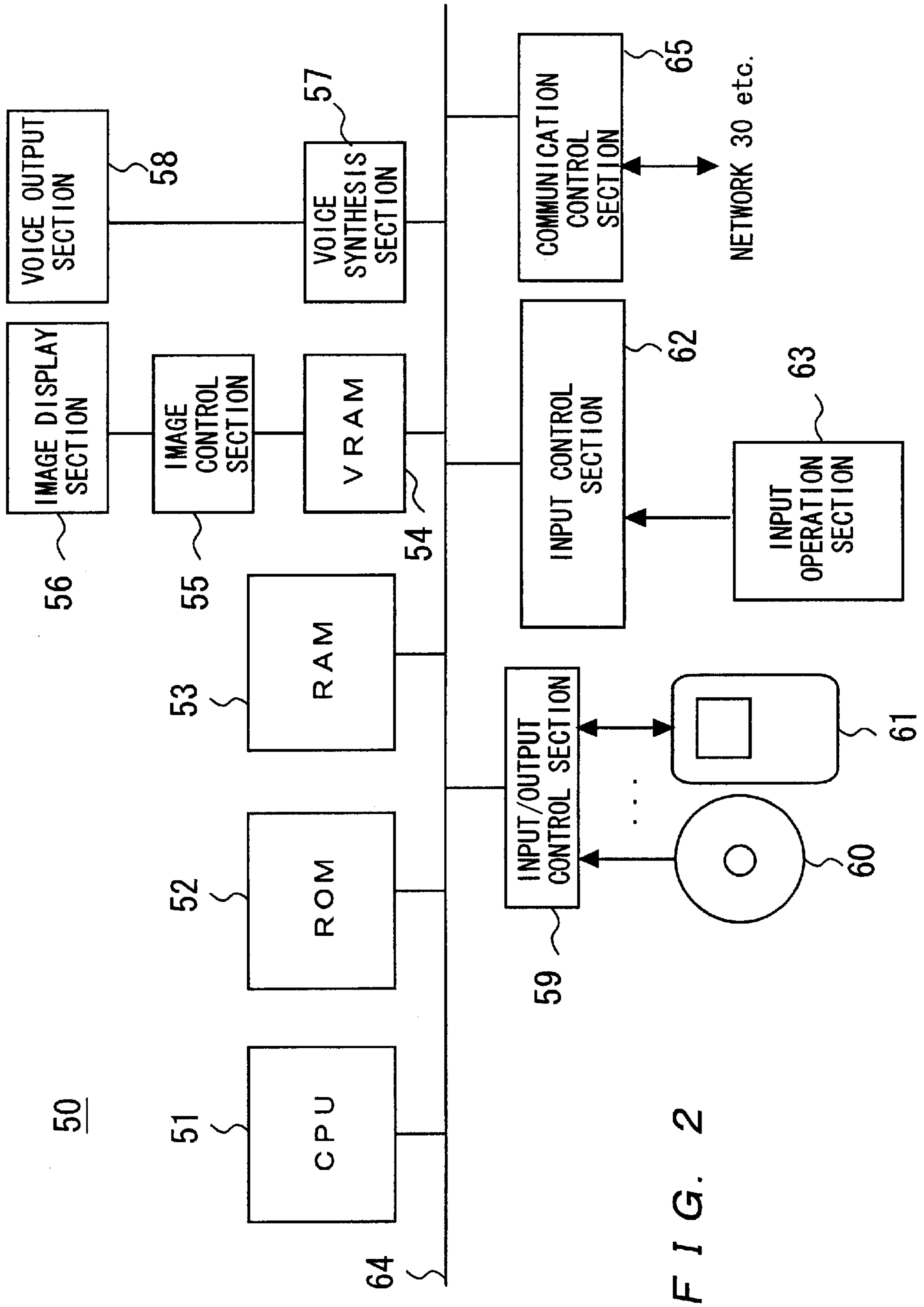
FIG. 2 shows internal circuit blocks of the client computer 10, etc.

FIG. 2 shows internal circuit blocks of the client computer 10, etc. In FIG. 2, reference numeral 50 denotes an internal circuit block of the client computer 10, etc. of the present invention, reference numeral 51 denotes a processing unit CPU (Central Processing Unit) that executes the task processing method, etc. of the present invention that allows the client computer 10, etc. to execute a task such as a computer game, reference numeral 52 denotes a read-only storage unit ROM (Read-Only Memory) that stores data necessary for processing such as initialization of the internal circuit blocks 50 of the client computer 10, etc., reference numeral 53 denotes a readable/writable storage unit RAM (Random Access Memory) that stores a computer program or data executed by the CPU 51, reference numeral 54 denotes a recording unit VRAM (Video RAM) that has a capacity equivalent to a volume of data corresponding to one screen of an image display section 56, which is used as image memory and will be described later, reference numeral 55 denotes an image control section that converts the data of the VRAM 54 to image data and sends to an image display section 56, reference numeral 56 denotes an image display section such as a display that displays an image based on the image data converted and sent by the VRAM 54, reference numeral 57 denotes a voice synthesis section that synthesizes voice generated by execution of the task processing method, etc. of the present invention, reference numeral 58 denotes a voice output section that is connected to the voice synthesis section 57 and outputs the voice, reference numeral 60 denotes a recording medium section that sets a detachable recording medium such as a computer-readable CD-ROM (Compact Disc-Read Only Memory) that records the computer program or data, etc. to execute the task processing method, etc. of the present invention, reference numeral 61 denotes a recording medium section that sets a detachable recording medium such as a memory card, reference numeral 59 denotes an input/output control section that is connected to the recording medium section 60 or 61 and controls input/output, reference numeral 63 denotes an input operation section such as a mouse and keyboard operated by the player of the client computer 10, etc. of the present invention, reference numeral 62 denotes an input control section that is connected with the input operation section 63 and performs input control, etc., reference numeral 65 denotes a communication control section that controls a communication with the external server computer 14 via the network 30 and reference numeral 64 denotes a bus that connects the CPU 51, ROM 52, RAM 53, VRAM 54, voice synthesis section 57, input/output control sections 59 and 62, etc. and communication control section 65.

The computer program and data that execute the task processing method of the present invention can be stored in a CD-ROM or memory card, etc. set in the recording medium section 60 or 61. The computer program and data above recorded in the recording medium such as the CD-ROM or memory card are loaded into the RAM 53 through the bus 64 via the input/output control section 59. By executing the computer program above loaded into the RAM 53, the CPU 51 allows the player to input from the input operation section 63 via the input control section 62, the image display section 56 to display the image being executed and the voice output section 58 to output the voice being executed.

First Embodiment

An outline of the network ranking method, etc. according to First Embodiment of the present invention will be explained using screens displayed on the image display section 56 of the client computer 10, etc. When the client computer 10, etc. requests the server computer to issue a computer game to be played, the server computer 14 issues the client computer 10, etc. a computer game whose play result will be competed for a predetermined period of time, for example, only once a day.

Figure 3:
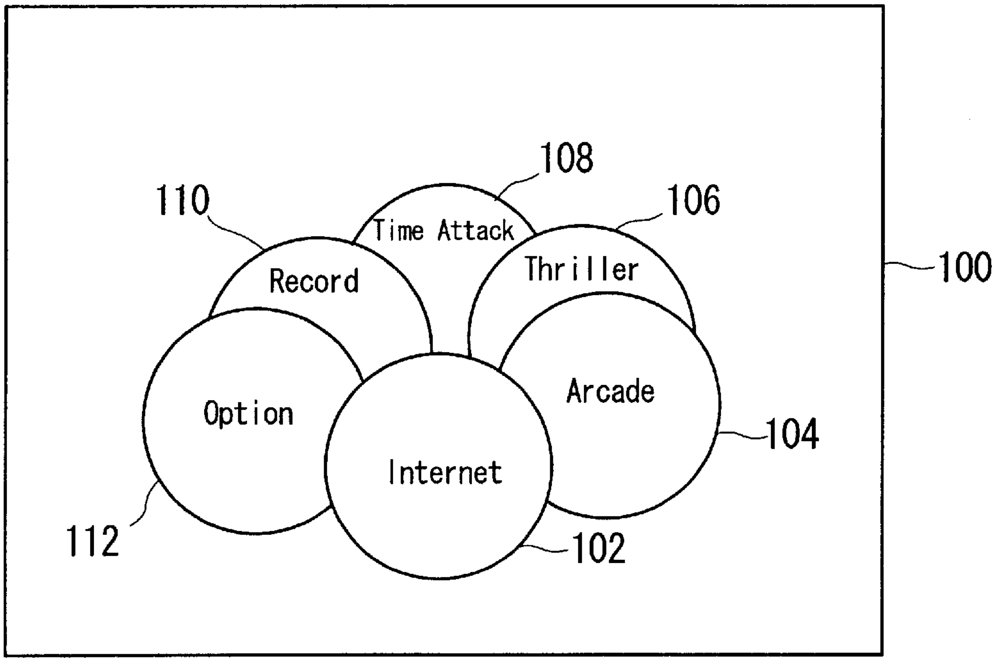
FIG. 3 shows an initial screen in First Embodiment of the present invention after the computer game is issued to the client computer.

FIG. 3 shows an initial screen in First Embodiment of the present invention after the computer game is issued to the client computer. In FIG. 3, reference numeral 102 denotes an Internet icon connected to the network 30 by clicking using the input operation section 63 such as a mouse, reference numeral 104 denotes an arcade icon to select an arcade-version computer game by clicking using the input operation section 63 such as a mouse, reference numeral 106 denotes a thriller icon to select a thriller type computer game by clicking using the input operation section 63 such as a mouse, reference numeral 108 denotes a time attack icon to select a time-limited computer game by clicking using the input operation section 63 such as a mouse, reference numeral 110 denotes a record icon to store the play result by clicking using the input operation section 63 such as a mouse, reference numeral 112 denotes an option icon to make various settings of the computer game by clicking using the input operation section 63 such as a mouse and reference numeral 100 denotes an initial screen to display the above described arcade icon 104, etc.

Clicking on the Internet icon 102 in the initial screen 100 in FIG. 3 makes it possible to select a computer game that allows a plurality of players of the client computer 10, etc. to compete against one another for the play results.

Figure 4:
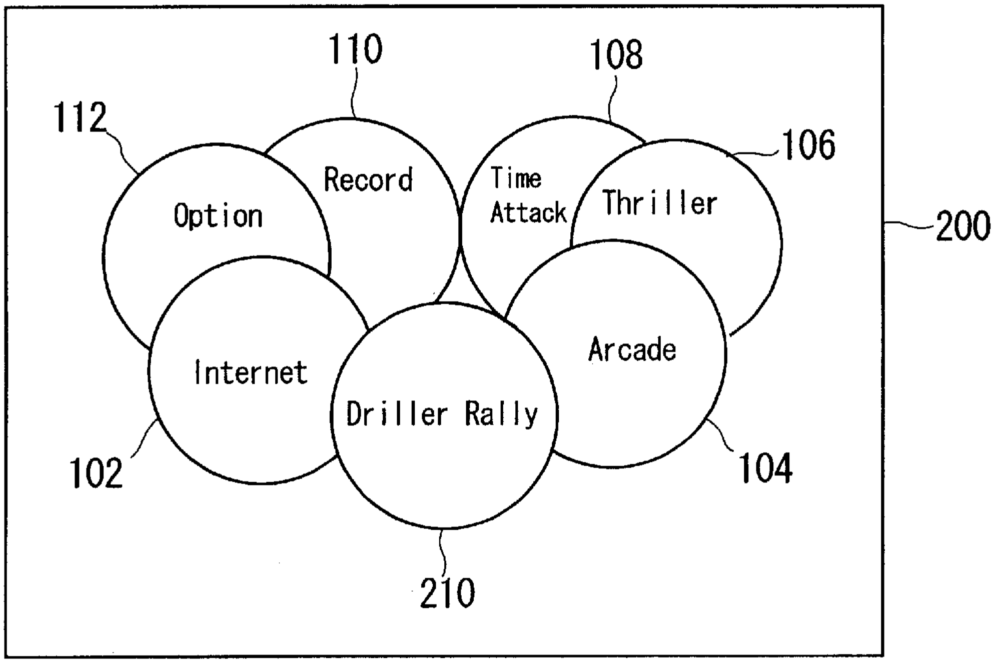
FIG. 4 shows the screen after the Internet icon 102 in the initial screen 100 in FIG. 3 is clicked.

FIG. 4 shows the screen after the Internet icon 102 in the initial screen 100 in FIG. 3 is clicked. The same reference numerals in FIG. 4 as those in FIG. 3 denote the same parts, and therefore explanations thereof will be omitted. In FIG. 4, reference numeral 210 denotes a driller rally icon, one of computer games that allow a plurality of players of the client computer 10, etc. to compete against one another for the play results and reference numeral 200 denotes the screen including the driller rally icon 210.

Figure 5:
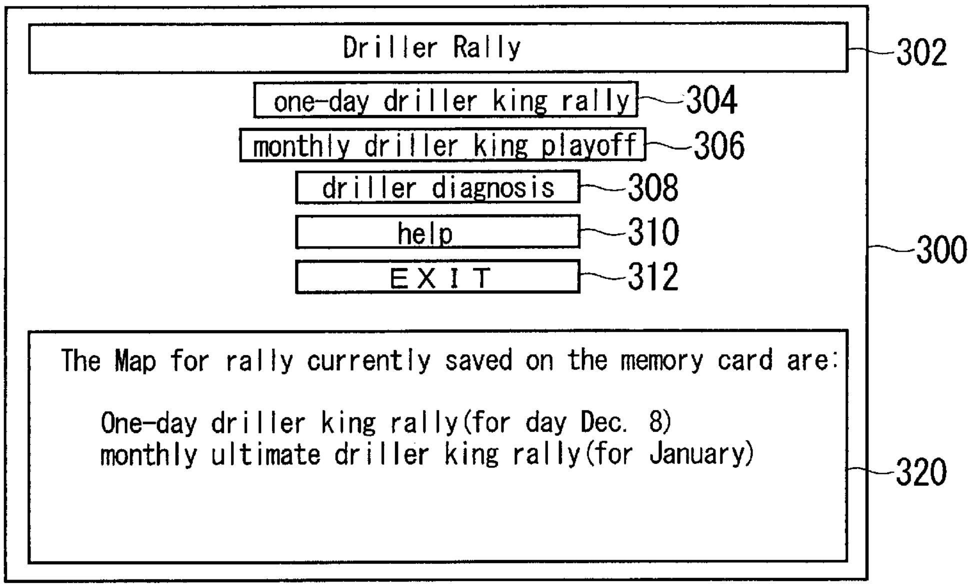
FIG. 5 shows the screen after the driller rally icon 210 in the screen 200 in FIG. 4 is clicked.

FIG. 5 shows the screen after the driller rally icon 210 in the screen 200 in FIG. 4 is clicked. In FIG. 5, reference numeral 302 denotes a display indicating the driller rally, one of computer games that allow a plurality of players of the client computer 10, etc., reference numeral 304 denotes a one-day driller king rally icon to select to participate in a driller rally and compete for ranking on a one-day basis (predetermined period of time), reference numeral 306 denotes a monthly driller king playoff icon to select to participate in a driller rally and compete for ranking for one month (predetermined period of time), reference numeral 308 denotes a driller diagnosis icon to make a predetermined diagnosis, reference numeral 310 denotes a help icon to answer questions concerning the driller rally, reference numeral 312 denotes an EXIT icon to exit the driller rally, reference numeral 320 denotes a data display of the driller rally saved in the recording medium such as the memory card connected to the recording medium section 61 of the client computer 10, etc. and reference numeral 300 denotes a screen including the display 302 above, etc.

As shown in FIG. 5, the computer game issued to the client computer 10, etc. by the server computer 14 is saved on the recording medium such as the memory card connected to the recording medium section 61. The information regarding this computer game is displayed on the display 320 as "One-day driller king rally (for day December 8), monthly ultimate driller king rally (for January)". This display 320 shows that the predetermined time limit until which players can compete for the play result and register the result is December 8, etc.

Figure 6:
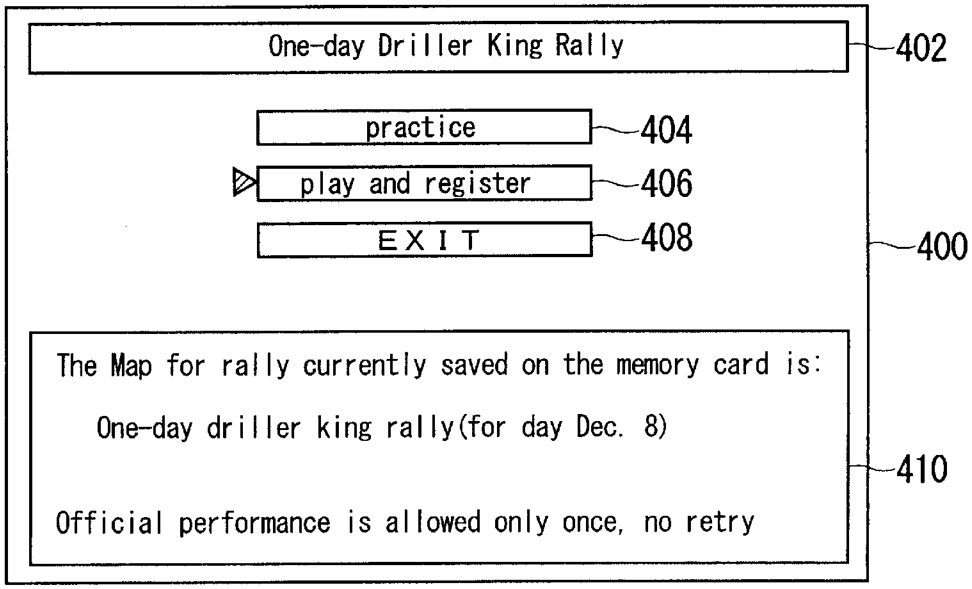
FIG. 6 shows the screen after the one-day driller king rally icon 302 in the screen 300 in FIG. 5 is clicked.

FIG. 6 shows the screen after the one-day driller king rally icon 302 in the screen 300 in FIG. 5 is clicked. In FIG. 6, reference numeral 402 denotes a display indicating a one-day driller king rally that selects to hold a one-day driller rally and compete for ranking, reference numeral 404 denotes a practice icon to select practice the computer game of the one-day driller rally, reference numeral 406 denotes a play and register icon to select to take up an official performance of the one-day driller rally computer game and register the result in the server computer 14, reference numeral 408 denotes an EXIT icon to exit the one-day driller king rally, reference numeral 410 denotes an advice display shown as a result of selecting the play and register icon 406 and reference numeral 400 denotes a screen including the display 402 above, etc.

As shown in FIG. 6, the computer game issued as a task from the server computer 14 can be practiced any number of times by selecting the practice icon 404. However, what can be registered as the play result for the day (December 8) is only one result of the play performed after selecting the play and register icon 406. This is displayed on the advice display 410 as "Official performance is allowed only once, no retry". As a result, even an experienced player has a feeling of tension because no retry is possible, and may sometimes obtain play results lower than those in the practice time. This gives a beginner chances to be ranked high, thus keeping him/her from losing interest in the computer game.

Figure 7:
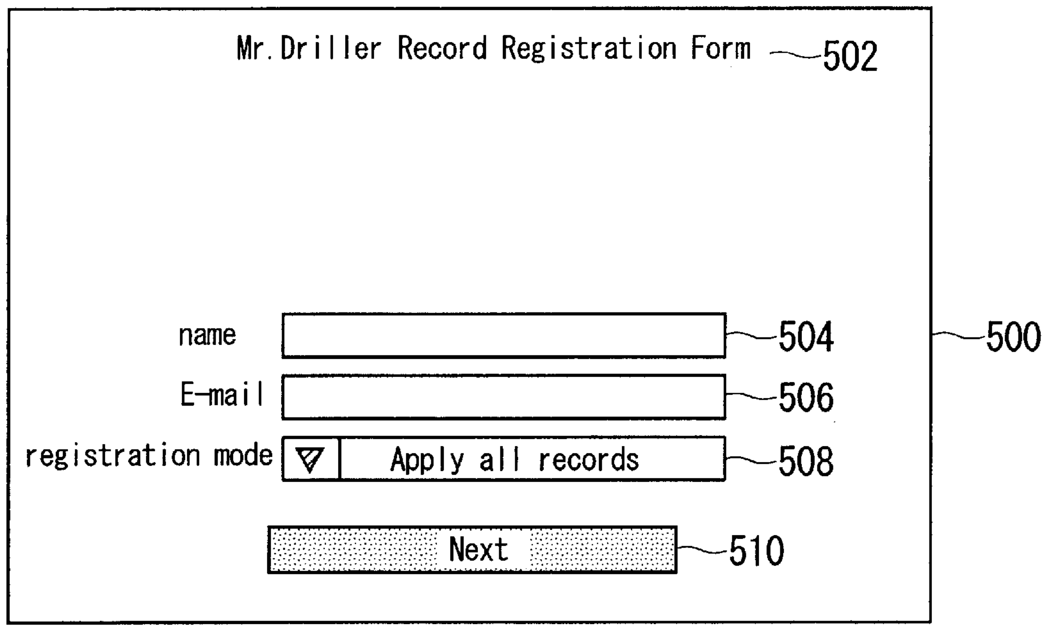
FIG. 7 shows a registration form to enter various kinds of data when the play result in First Embodiment of the present invention is sent.

After the play and register icon 406 in FIG. 6 is selected and the player obtains the play result, the player sends the play result to the server computer 14. FIG. 7 shows a registration form to enter various kinds of data when the play result in First Embodiment of the present invention is sent. In FIG. 7, reference numeral 502 denotes a display "Mr. driller record registration form" that is a registration form to be filled out when the play result is sent, reference numeral 504 denotes a field to enter the name of the player, reference numeral 506 denotes a field to enter the e-mail address of the player, reference numeral 508 denotes a registration mode field by which a choice can be made from various registration modes, reference numeral 510 denotes a "Next" display to move to the next screen as required, reference numeral 500 denotes a screen including the display 502, etc. As displayed in the registration mode field 508 as "Apply all records", all recorded data including the play result of the player is sent to the server computer 14.

Figure 8:
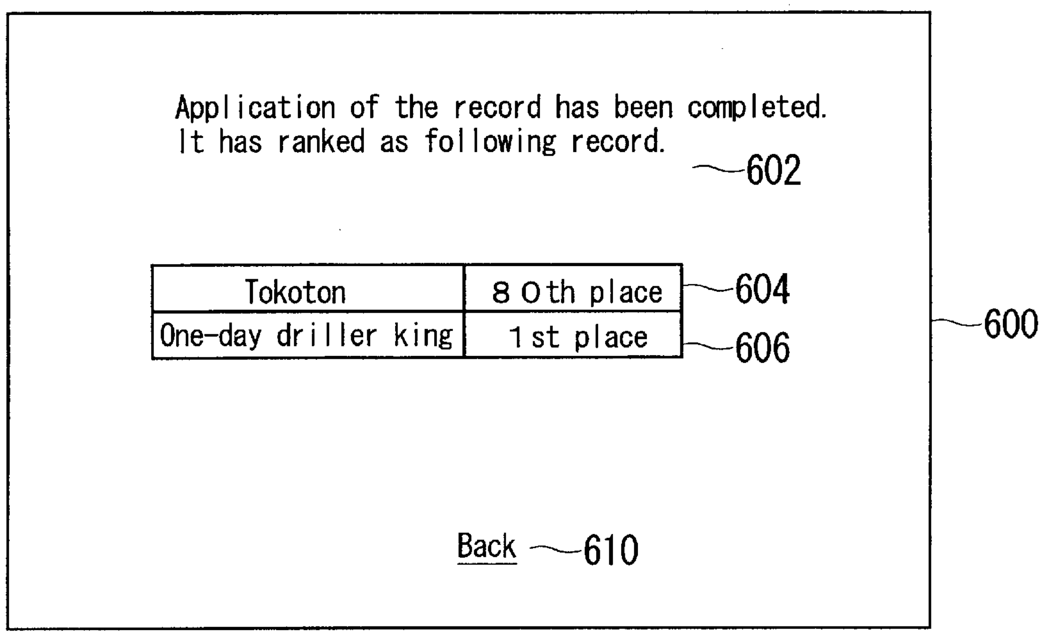
FIG. 8 shows the screen after the various data including the play result is sent to the server computer 14 in First Embodiment of the present invention and the application for ranking is completed.

FIG. 8 shows the screen after the various data including the play result is sent to the server computer 14 in First Embodiment of the present invention and the application for ranking is completed. In FIG. 8, reference numeral 602 denotes a display indicating that transmission to the server computer 14 has been completed and ranking has been completed, reference numeral 604 denotes a display indicating the ranking of a computer game called "Tokoton (to the ultimate)", reference numeral 606 denotes a display indicating the ranking of a computer game called "One-day driller king", reference numeral 610 denotes a display indicating a selection to go back to the previous screen and reference numeral 600 denotes a screen including the display 602, etc. As shown in the display 606, it is seen that the ranking of the computer game called "one-day driller king" above is No. 1.

Figure 9:
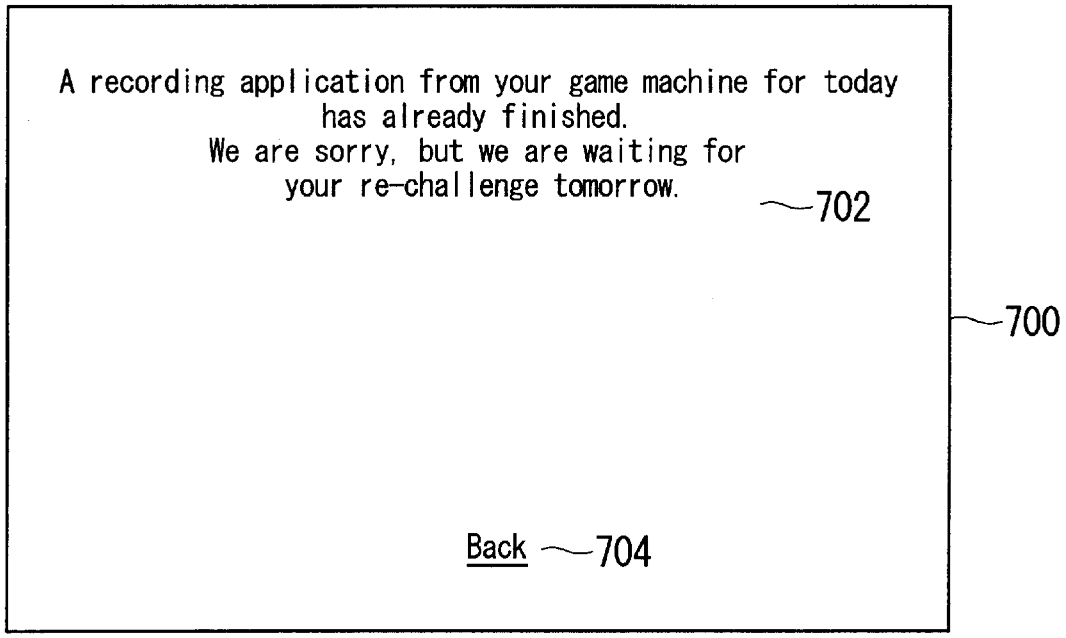
FIG. 9 shows a warning screen when the player of the specific client computer 10, etc. according to First Embodiment of the present invention makes a double application.

As described above, the player of the specific client computer 10, etc. can only apply for a registration of the play result once a day about the same computer game. If the player of the specific client computer 10, etc. attempts to apply for a registration of the play result two or more times a day about the same computer game, this application is double application, and therefore a warning is issued from the server computer 14. FIG. 9 shows a warning screen when the player of the specific client computer 10, etc. according to First Embodiment of the present invention makes a double application. In FIG. 9, reference numeral 702 denotes a display indicating a warning "A recording application from your game machine (the specific client computer 10, etc.) for today (e.g., December 8) has already finished", reference numeral 704 denotes a display indicating a selection to go back to the previous screen and reference numeral 700 denotes a warning screen including the display 702, etc.

Figure 10:
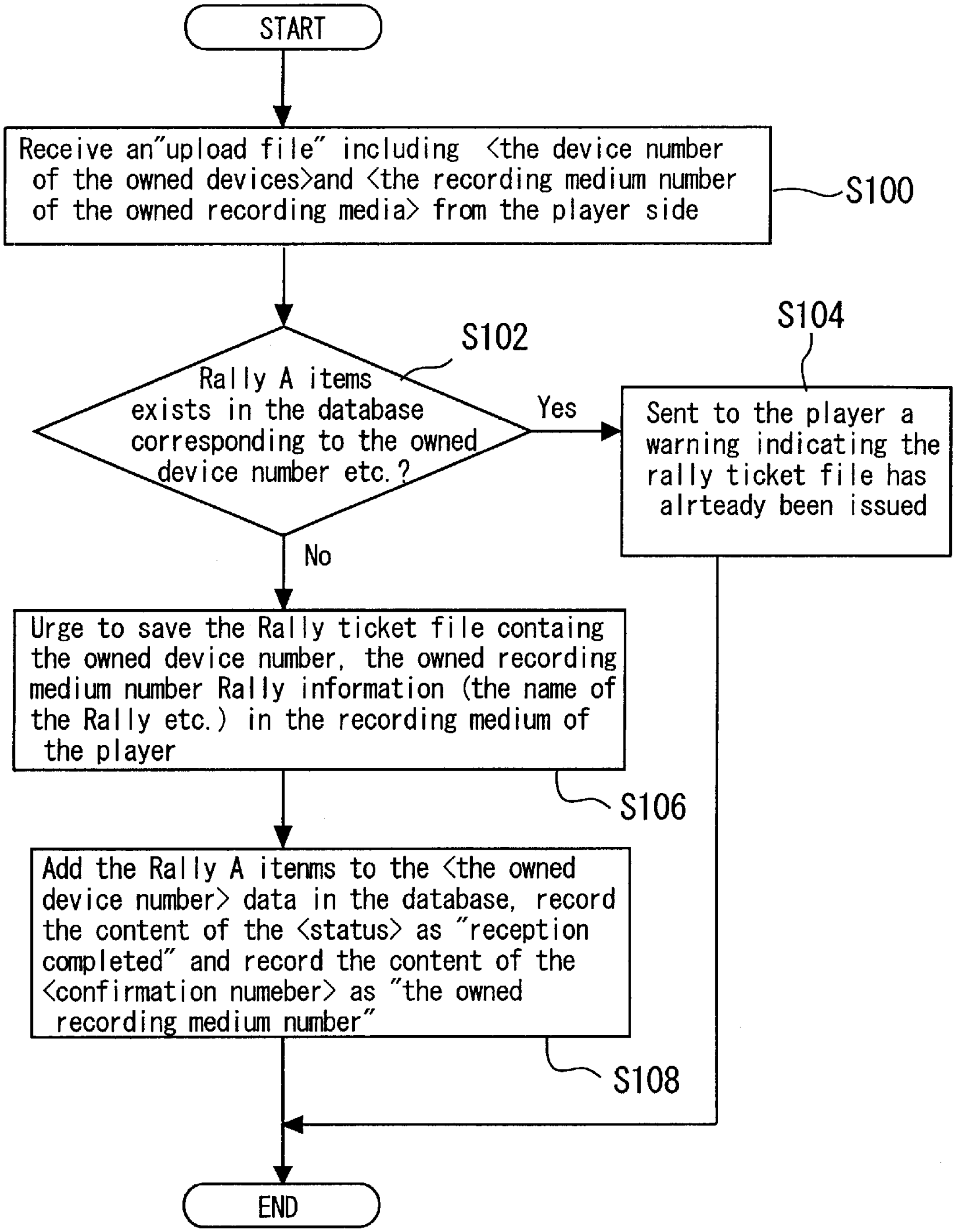
FIG. 10 shows flow charts of the network ranking method according to First Embodiment of the present invention.
Figure 11:
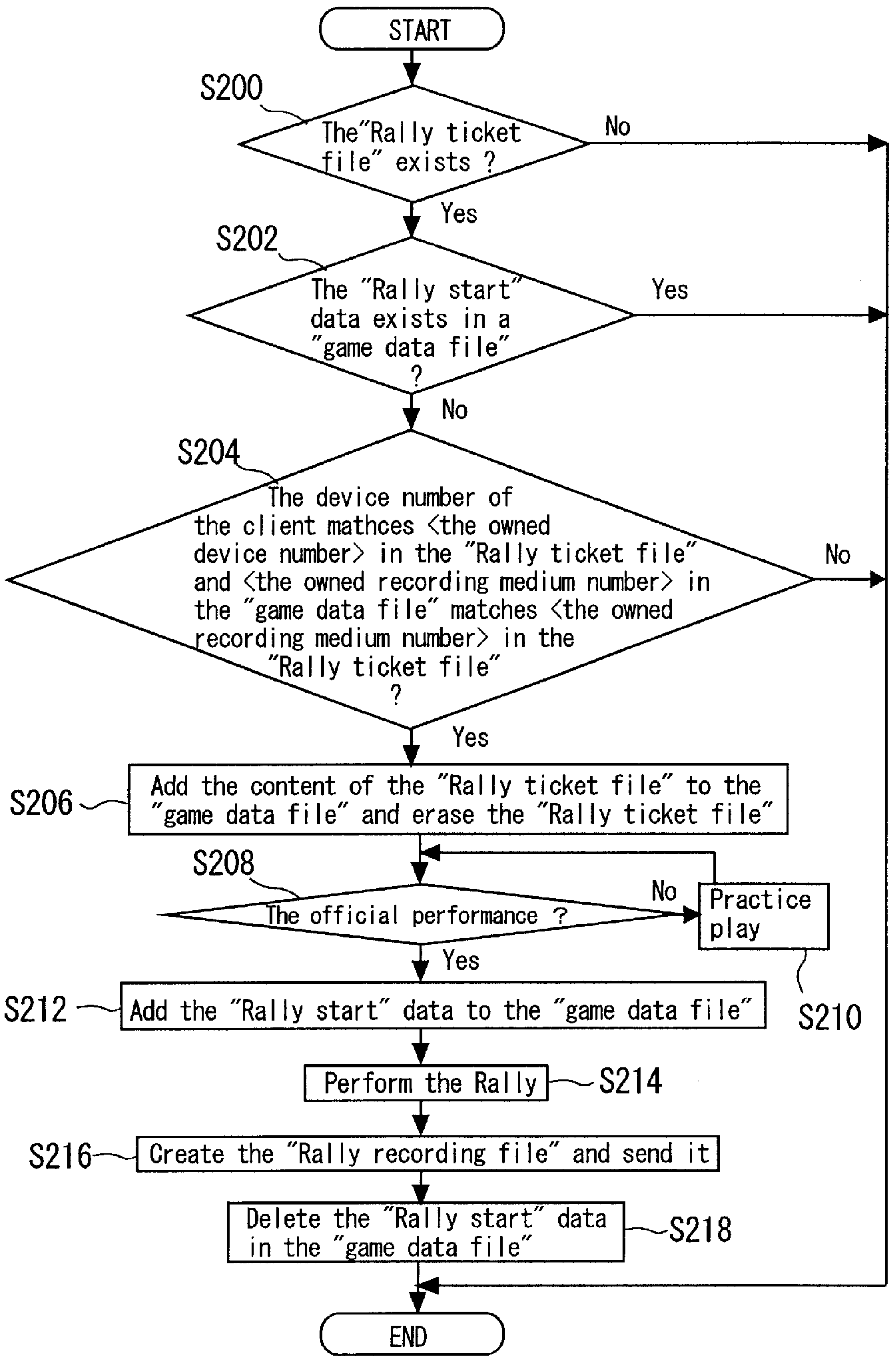
FIG. 11 shows flow charts of the network ranking method according to First Embodiment of the present invention.
Figure 12:
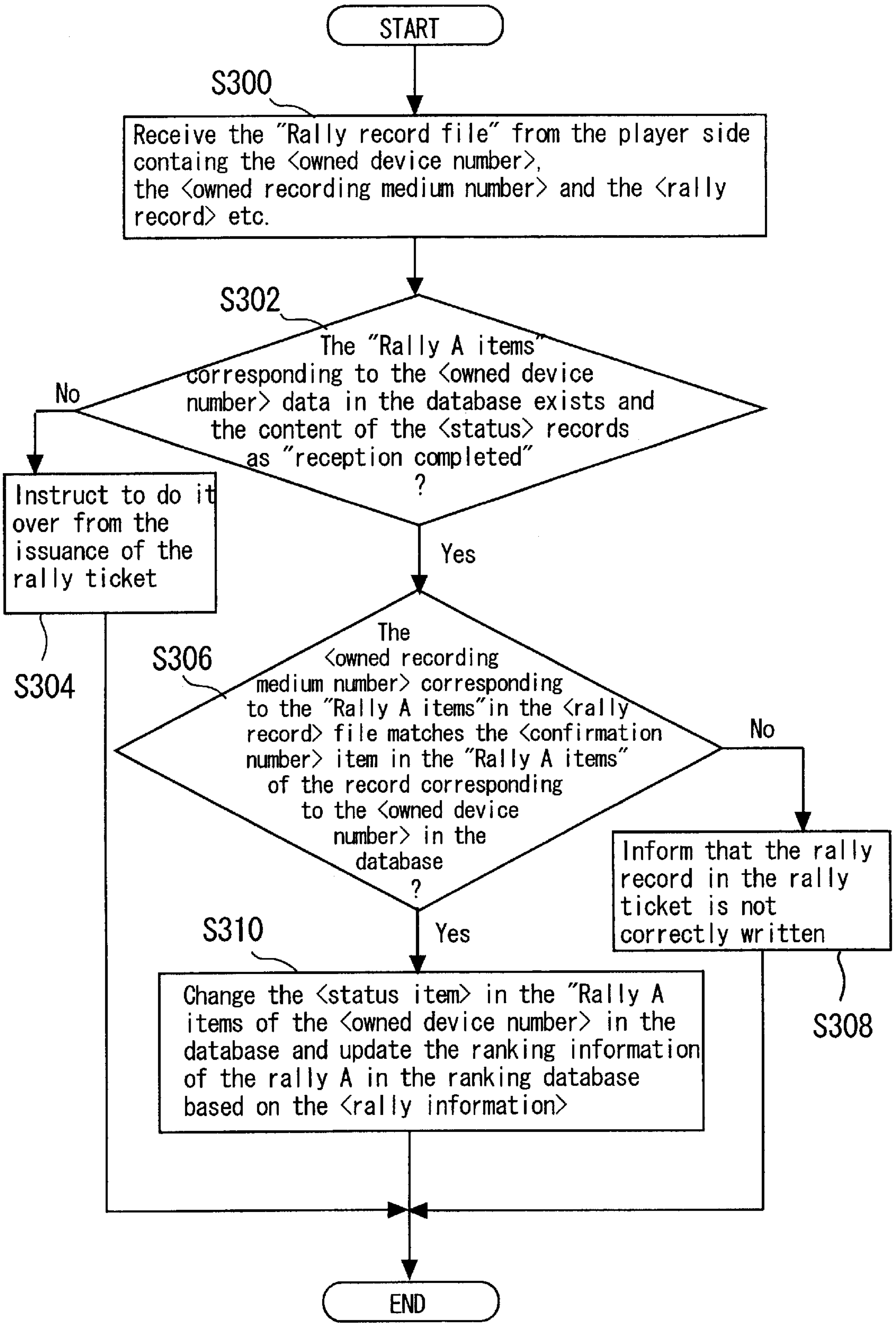
FIG. 12 shows flow charts of the network ranking method according to First Embodiment of the present invention.

FIG. 10 to FIG. 12 show flow charts of the network ranking method according to First Embodiment of the present invention. FIG. 10 shows a flow chart of task issuance processing (task issuing means) by the server computer 14, FIG. 11 shows a flow chart of task processing and transmission, etc. of the processing result by the client computer 10, etc. to which the task is issued from the server computer 14 and FIG. 12 shows a flow chart of ranking, etc. by the server computer 14 to which the processing result is sent from the client computer 10, etc.

As shown in FIG. 10, the server computer 14 receives an upload file (task requesting data) including the device number (identifier) of the owned devices such as the client computer 10, etc. and the recording medium number of the owned recording media such as the memory card set in the recording medium 61 from the client computer 10, etc. on the player side (step S100). Then, the server computer 14 determines whether or not rally items such as the one-day driller king rally (hereinafter referred to as "Rally A items") already exist in the record in the database (not shown) in the server computer 14 corresponding to the owned device number and owned recording medium number received in step S100 (step S102). The rally A items, as will be described later, are set when the client computer 10, etc. requests the server computer 14 to issue a computer game, etc. and the computer game, etc. is issued after a predetermined check and the status item in the rally A items is set as "Reception completed (issued)". Later, when the client computer 10, etc. applies to the server computer 14 for ranking of the play result of the computer game, etc. and when the ranking is registered after a predetermined check, the status item in the rally A items is set as "Rally completed".

The necessity of determination in the above step S102 will be explained. The computer game, etc. downloaded from the server computer 14 is saved in the memory card, etc. set in the recording medium 61 of the client computer 10, etc. The player can execute (play) the computer game, etc. downloaded and saved in the memory card, etc. several times including practice. The server computer 14 checks whether or not the ranking application from the player of the client computer 10 is the application sent only once for the day. This check is conducted to create a situation in which by accepting the registration of ranking of the play result only once a day, even experienced players can experience a feeling of tension because no retry is possible for the day on one hand, and even beginners whose play result may not be too high, can still expect that their results will be ranked high for the day on the other.

However, there can also be a case where the player copies the computer game, etc. downloaded from the server computer 14 to a plurality of other memory cards, etc. set in the recording medium 61 of the client computer 10, etc. In such a case, if the player sends a plurality of different play results of a plurality of computer games copied in a plurality of memory cards, etc. to the server computer 14 for a ranking application, then the server computer 14 will no longer be able to check whether or not the play results received are the ones for which the client computer 10, etc. has applied for ranking only once a day. In such a case, the player will be able to apply for ranking a plurality of times a day (double application), with the result that experienced players will apply for ranking with high records, thus making it difficult for beginners to be ranked high.

Therefore, when the client computer 10, etc. requests the server computer 14 for issuance of the computer game, etc., the owned recording medium number is also included in the upload file in addition to the owned device number to identify the client computer 10, etc. and the server computer 14 makes the above determination in step S102 and checks whether any double-application of the play result is made or not. That is, as will be described later, in the case where the rally A items already exist in the record above and the status item in the rally A items is "Rally completed", this means that the play result has already been applied, and in this way it is possible to check whether or not this is a case of a double application. When it is determined that this is not a double application, it is urged to save the file containing the name of the rally, the computer game to be the task, etc. (hereinafter referred to as "Rally ticket file") in the recording medium of the player (step S106, task sending means) in addition to the owned device number and the owned recording medium number received in step S100. In the stage of this step S106, the client computer 10, etc. on the player side can receive the computer game, etc. which is the task. After receiving the notice that saving from the client computer 10, etc. on the player side has been completed, etc., the rally A items are added to the record corresponding to the owned device number received in step S100 in the database of the server computer 14, the content of the status item in these rally A items is recorded as "Reception completed (issued)" and the owned recording medium number is recorded as the content of the confirmation number item in the rally A items (step S108, issued recording means) and in this way the process ends. In the case where it is determined in step S102 that this is a double application, a warning indicating that the rally ticket file has already been issued is sent to the client computer 10, etc. of the player (step S104) and the process ends.

In the above-described processing of the server computer 14, the number of times the computer game, etc. is issued from the server computer 14 to the specific client computer 10, etc. can be set to two or more instead of once a day (predetermined period of time). Even in the case where the computer game, etc. is issued a plurality of times, it is still possible to check the double-application of the ranking of the play result resulting therefrom, and therefore it is also possible to issue the computer game, etc. from the server computer 14 to the specific client computer 10, etc. a plurality of times (predetermined number of times). In this case, the status item of the rally A items corresponding to the specific client computer 10, etc. remains to be set to the value "Reception completed (issued)". By making it possible to issue the computer game, etc. a plurality of times, even if the computer game, etc. is erased by mistake after the player officially downloads the computer game, etc. and before applying for ranking of the play result, the player can download the computer game, etc. again.

As shown in FIG. 11, the client computer 10, etc. checks whether or not the rally ticket file sent from the server computer 14 exists (step S200) and ends the processing in the case where that file does not exist. Then, the client computer 10, etc. checks whether or not the rally start data indicating that the rally has already been started exists in a game data file (not shown) that records the computer game result (step S202) and ends the processing in the case where the rally start data already exists because it is overlapping. Then, the client computer 10, etc. checks whether or not the device number of the client computer 10, etc. matches the owned device number in the rally ticket file sent from the server computer 14 and the owned recording medium number in the game data file matches the owned recording medium number in the rally ticket file sent from the server computer 14 (step S204, task processing means). The check in step S204 can verify whether or not the owned device number and owned recording medium number in the upload file sent from the client computer 10, etc. to the server computer 14 to request a task match the owned device number and owned recording medium number in the rally ticket file issued from the server computer 14. When the match is confirmed, the client computer 10, etc. adds the content of the rally ticket file sent from the server computer 14 to the game data file and then erases the rally ticket file (step S206).

As described above, before the official performance, the player can practice the computer game sent from the server computer any number of times (steps S208, S210). When the player selects the official performance, the client computer 10, etc. adds the rally start data to the game data file (step S212) and performs the rally (step S214). The client computer 10, etc. creates a rally recording file containing the rally records such as the owned device number, owned recording medium number and play results, etc. and sends the file to the server computer 14 (step S216, processing result sending means), depending on the kinds of computer game (rally A items, etc.). Finally, the client computer 10, etc. deletes the rally start data in the game data file (step S218) and ends the processing.

As shown in FIG. 12, the server computer 14 receives the aforementioned rally record file from the client computer 10, etc. on the player side (step S300). Then, the server computer 14 determines whether or not the rally A items exist in the record in the database in the server computer 14 corresponding to the owned device number received in step S300 and the content of the status item in the rally A items is recorded as "reception completed (issued)" (step S302). In the case where the rally A items do not exist in the record corresponding to the owned device number, the server computer 14 instructs the player to do it over from the issuance of the rally ticket (step S304) and ends the processing. Otherwise, the server computer 14 checks whether or not the owned recording medium number corresponding to the rally A items in the rally record file matches the confirmation number item in the rally A items of the record corresponding to the owned device number received in step S300 in the database (step S306), and if these two match, the server computer 14 changes the status item in the rally A items to "rally completed", updates the ranking information of the rally A in the ranking database (not shown) that records the ranking (step S310, ranking means) and ends the process. In the case where it is determined in step S306 that the two numbers do not match, the server computer 14 informs that the rally record in the rally ticket is not correctly written (step S308) and ends the process.

In First Embodiment above, the task issued from the server computer 14 to the client computer 10, etc. is sent in the form of a computer program that executes a computer game, etc. However, the form of the task to be sent can also be data required to execute the computer program. For example, when the computer game requests the player to follow a predetermined passage, etc. or destroy combinations of predetermined components, the server computer 14 sends data which serves as the basis for generating the predetermined passage or combinations of predetermined components and the client computer 10, etc. can also generate the predetermined passage, etc. based on the data transmitted. In this case, the client computer 10, etc. holds the computer game program. Whichever is the case, the task issued from the server computer 14 to the client computer 10, etc. can be identical (identity guaranteeing means). This makes it possible to issue the same task to both experienced players and beginners and treat all players fairly. Furthermore, it is also possible to easily issue a different task every time a predetermined period (1 day) passes.

As stated above, according to First Embodiment, it is possible to set to only 1 the number of times per day the play result of a computer game issued as a task from the server computer 14 to each client computer 10, etc. can be registered for one day. This allows even experienced players to experience a feeling of tension that no retry is possible. On the other hand, this also allows beginners to maintain their interest in the computer game because their play results, however low they may be, also have chances to be ranked high.

Second Embodiment

It goes without saying that the object of the present invention can also be attained by supplying a recording medium that records the computer program that implements the function of the above embodiment to the game machine of the present invention and by making the computer CPU 51 of the game machine read and execute the computer program stored in the recording medium set in the recording medium section 60, etc. In this case, the computer program itself read from the recording medium above implements the new function of the game machine of the present invention and the recording medium that records the computer program constitutes the present invention. As the recording medium that records the computer program, a CD-ROM, floppy disk, hard disk, ROM, memory card or optical disk, etc. can be used.

As stated above, according to Second Embodiment, it is possible to attain the object of the present invention by supplying a recording medium that records the computer program that implements the function of the above embodiment to the game machine of the present invention and by making the computer CPU 11 of the game machine read and execute the computer program stored in the recording medium.

As described above, the present invention can provide a client computer, server computer, network ranking system, network ranking method, task processing method and recording medium allowing even experienced players to keep a feeling of tension and allowing even beginners to have chances to be ranked high by setting to only one the number of times the play result of a computer game issued as a task from the server computer 14 to each client computer 10, etc. can be registered for one day.

In the network ranking, the task issuing means may comprise task sending means for sending the task including the task requesting data to the client computer when it is confirmed based on the task requesting data sent from the client computer that the request for issuing the task is a request made within the range of a predetermined number of times for a predetermined period for the client computer; and issued recording means for recording that the task sent by the task sending means is already issued to the client computer.

In the network ranking system, the ranking means may register the ranking of the client computer based on the processing result when it is confirmed from the identifier of the client computer included in the task processing result sent from the client computer that the issued recording means has already issued the task to the client computer.

In the network ranking system, the task processing means may processe the task when it is confirmed that the identifier included in the task issued from the server computer matches the identifier of the client computer.

Here, in the network ranking system, the server computer may further comprise identity guaranteeing means for guaranteeing that the task issued only once for a predetermined period is identical for each of the client computers.

In the network ranking system, the identity guaranteeing means may issue the task only once for a predetermined period in the form of a computer program executed by each of the client computer.

In the network ranking system, the identity guaranteeing means may issue the task only once for a predetermined period in the form of data of a computer program executed by each of the client computer.

In the network ranking system, the task may be a computer game or data required when a computer game is executed.

The present invention has been described in detail with respect to various embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

The entire disclosure of Japanese Patent Application No. 2000-95644 filed on Mar. 30, 2000 including specification, claims, drawings and summary are incorporated herein by reference in its entirety.

What is claimed is:

1. A network ranking system having a server computer and a plurality of client computers interconnected with the server computer via a network and ranking the processing result of each client computer for a task issued by the server computer, said server computer comprising:

task issuing means for issuing a task to each client computer to compete against one another for the processing result a predetermined number of times per a predetermined period; and ranking means for receiving an application for ranking based on the result of processing the task sent from each client computer only once for the predetermined period and registering the application, and said client computer comprising:

task requesting means for sending task requesting data including the identifier of said client computer and task issuance request to the server computer;

task processing means for processing the tasks issued from said server computer; and processing result sending means for sending the task processing result including the identifier of said client computer and task processing by said task processing means to said server computer.

2. The network ranking system according to claim 1, wherein said task issuing means comprising:

task sending means for sending the task including the task requesting data to said client computer when it is confirmed based on the task requesting data sent from said client computer that the request for issuing the task is a request made within the range of a predetermined number of times per a predetermined period for said client computer; and issued recording means for recording that the task sent by said task sending means is already issued to said client computer.

3. The network ranking system according to claim 2, wherein said ranking means registers the ranking of said client computer based on the processing result when it is confirmed from the identifier of said client computer included in the task processing result sent from said client computer that said issued recording means has already issued the task to said client computer.

4. The network ranking system according to claim 1, wherein said task processing means processes the task when it is confirmed that the identifier included in the task issued from said server computer matches the identifier of said client computer.

5. The network ranking system according to claim 1, wherein said server computer further comprises identity guaranteeing means for guaranteeing that the task issued only once per a predetermined period is identical for each of said client computers.

6. The network ranking system according to claim 5, wherein said identity guaranteeing means issues the task only once per a predetermined period in the form of a computer program executed by each of said client computer.

7. The network ranking system according to claim 5, wherein said identity guaranteeing means issues the task only once per a predetermined period in the form of data of a computer program executed by each of said client computer.

8. The network ranking system according to any one of claims 1–7, wherein the task is a computer game or data required when a computer game is executed.

9. A client computer connected to a server computer via a network, competing against other client computers for the result of processing a task issued by the server computer, comprising:

task requesting means for sending task requesting data including the identifier of the client computer and a request for issuance of a task to a client computer whose processing result is to be competed a predetermined number of times per a predetermined period to the server computer;

task processing means for processing the task issued from the server computer; and processing result sending means for sending the task processing result including the identifier of the client computer and task processing by said task processing means to the server computer.

10. A server computer for controlling a plurality of client computers connected via a network, comprising:

task issuing means for issuing a task to each client computer to compete against one another for the processing results a predetermined number of times per a predetermined period; and ranking means for receiving an application for ranking based on the result of processing the tasks sent from each client computer only once for said predetermined period and registering the application.

11. A network ranking method using a server computer and a plurality of client computers interconnected with the server computer via a network and ranking the processing result of each client computer for a task issued by the server computer comprising:

a task requesting step of sending task requesting data including the identifier of the client computer and a task issuance request to the server computer;

a task issuing step of issuing a task to each client computer to compete against one another for the processing results a predetermined number of times per a predetermined period;

a task processing step of processing the task issued from the server computer; and a processing result sending step of sending the task processing result including the identifier of said client computer and task processing by said task processing step to the server computer and a ranking step of receiving an application for ranking based on the processing result of the task sent from each client computer only once for the predetermined period and registering the application.

12. A task processing method wherein a client computer connected with a server computer via a network competes against other client computers for processing results of a task issued by the server computer, comprising:

a task requesting step of sending to the server computer task requesting data including the identifier of the client computer and a request for issuance of task to a client computer whose processing result is to be competed a predetermined number of times per a predetermined period;

a task processing step of processing the task issued from the server computer; and a processing result sending step of sending the task processing result including the identifier of the client computer and task processing by said task processing step to the server computer.

13. A recording medium storing a computer-readable program that executes a task processing method, wherein a client computer connected with a server computer via a network competes against other client computers for processing results of a task issued by the server computer, comprising:

a task requesting step of sending to the server computer task requesting data including the identifier of the client computer and a request for issuance of task to a client computer whose processing result is to be competed a predetermined number of times per a predetermined period;

a task processing step of processing the task issued from the server computer; and a processing result sending step of sending task processing results including the identifiers of the client computer and task processing by said task processing step to the server computer.

14. The invention according to claim 9, wherein the predetermined period of time comprises a predetermined length of time.

15. The invention according to claim 14, wherein the predetermined length of time is equal to one day.

* * * * *